United States Patent [19]
Antonelli et al.

[11] Patent Number: 5,770,648
[45] Date of Patent: Jun. 23, 1998

[54] PIGMENT DISPERSIONS CONTAINING AQUEOUS BRANCHED POLYMER DISPERSANT

[75] Inventors: Joseph Albert Antonelli, Riverton, N.J.; Henry L. Jakubauskas, Chadds Ford, Pa.; Christopher Scopazzi, Wilmington, Del.

[73] Assignee: E. I. du Pont de Nemours and Company, Wilmington, Del.

[21] Appl. No.: 738,633

[22] Filed: Oct. 29, 1996

[51] Int. Cl.$^6$ .................................................... C08L 33/02
[52] U.S. Cl. ........................................... 524/533; 524/522
[58] Field of Search ...................................... 524/522, 533

[56] References Cited

U.S. PATENT DOCUMENTS

| | | | |
|---|---|---|---|
| 4,680,352 | 7/1987 | Janowicz et al. | 526/147 |
| 4,722,984 | 2/1988 | Janowicz | 526/123 |
| 4,940,760 | 7/1990 | Boettcher et al. | 526/190 |
| 5,019,634 | 5/1991 | Boettcher et al. | 526/262 |
| 5,037,716 | 8/1991 | Moffat | 430/109 |
| 5,102,936 | 4/1992 | Huth | 524/555 |
| 5,139,915 | 8/1992 | Moffat et al. | 430/110 |
| 5,204,208 | 4/1993 | Paine et al. | 430/137 |
| 5,231,131 | 7/1993 | Chu et al. | 524/504 |
| 5,310,778 | 5/1994 | Shor et al. | 524/556 |
| 5,362,826 | 11/1994 | Berge et al. | 526/194 |
| 5,371,151 | 12/1994 | Berge et al. | 525/377 |
| 5,424,364 | 6/1995 | Simms et al. | 525/170 |
| 5,468,801 | 11/1995 | Antonelli | 524/504 |
| 5,502,113 | 3/1996 | Antonelli et al. | 525/287 |

FOREIGN PATENT DOCUMENTS

| | | | |
|---|---|---|---|
| 61190576-A | 8/1990 | Japan . | |
| 02296812-A | 12/1990 | Japan . | |
| 2-296808 | 12/1990 | Japan | C08F 12/14 |

*Primary Examiner*—Paul R. Michl
*Attorney, Agent, or Firm*—Hilmar L. Fricke

[57] ABSTRACT

A waterbased dispersion useful for forming aqueous coating composition containing dispersed pigment, an aqueous carrier and a branched polymer dispersant (binder);

- the branched polymer has a weight average molecular weight of about 5,000–100,000 and contains 20–80% by weight of a hydrophilic backbone and correspondingly 80–20% by weight of macromonomer side chains; wherein
- the backbone is of polymerized ethylenically unsaturated monomers and 2–30% by weight, based on the weight of the backbone of polymerized ethylenically unsaturated monomers having an acid-functional group; and wherein at least 10% of the acid-functional groups are neutralized with an amine or an inorganic base and is hydrophilic in comparison to the side chains;
- the side chains are of macromonomers of polymerized ethylenically unsaturated monomers that are polymerized into the backbone via an ethylenically unsaturated group and the macromonomers have a weight average molecular weight of about 1,000–30,000 and wherein the weight ratio of pigment to binder is about 1/100–200/100.

10 Claims, No Drawings

5,770,648

PIGMENT DISPERSIONS CONTAINING AQUEOUS BRANCHED POLYMER DISPERSANT

TECHNICAL FIELD

This invention relates to improved waterborne pigment dispersions containing an aqueous branched polymer dispersant.

BACKGROUND OF THE INVENTION

Water dispersible polymers that are used as dispersants for pigments and used to form pigment dispersions useful in formulating waterborne coating compositions are known in the art. Such pigment dispersions are used in exterior water borne paints for automobiles and trucks. U.S. Pat. No. 5,231,131, issued Jul. 27, 1993 to Chu et al shows aqueous graft polymer pigment dispersants in which the side chains of the graft copolymer contain carboxyl groups that are neutralized with an inorganic base or an amine. While these graft copolymers are used as dispersants for pigments, relatively large amounts of polymerized ethylenically unsaturated acid monomers are present in the side chains of the graft copolymer to provide water dispersibility but the presence of these acid groups in the graft copolymer makes it sensitive to water. An exterior automotive or truck finish containing a water sensitive component is undesirable since for example, water spotting and acid etching will result and the finish will be subject to degradation by weathering.

A polymer dispersant is needed that will adequately disperse pigments and the dispersant should contain relatively small amounts of polymerized acid monomers. When pigment dispersions formulated from such a polymer are used in waterborne coating composition, a finish is formed that is free from the undesirable effects of water and weathering.

SUMMARY OF THE INVENTION

A waterbased pigment dispersion useful for forming aqueous coating composition containing dispersed pigment, an aqueous carrier and a branched polymer dispersant (binder);

the branched polymer has a weight average molecular weight of about 5,000–100,000 and contains 20–80% by weight of a hydrophilic backbone and correspondingly 80–20% by weight of macromonomer side chains; wherein the backbone of the branched polymer is of polymerized ethylenically unsaturated monomers and 2–30% by weight, based on the weight of the backbone, of polymerized ethylenically unsaturated monomers having an acid-functional group; and wherein at least 10% of the acid-functional groups are neutralized with an amine or an inorganic base and is hydrophilic in comparison to the side chains; and the side chains are of macromonomers of polymerized ethylenically unsaturated monomers that are polymerized into the backbone via an ethylenically unsaturated group and the macromonomers have a weight average molecular weight of about 1,000–30,000 and wherein the weight ratio of pigment to binder is about 1/100–200/100;

DETAILED DESCRIPTION OF THE INVENTION

The novel pigment dispersion is stable and in general is non flocculated or agglomerated and is compatible with a variety of polymeric film forming binders that are conventionally used in waterborne coating compositions and in particular, compatible with acrylic polymers that are used in waterborne coatings. The branched polymer dispersant upon curing of the coating composition into which it has been incorporated reacts with other film forming components of the coating composition and becomes part of the film and does not cause deterioration of the film upon weathering as may occur if it remained an unreacted component of the film. Also, since the branched polymer is an excellent dispersant, the ratio of polymer to pigment or polymer being dispersed is less than used with conventional dispersants. Further, the branched polymers allow for the use of higher molecular weight polymers that have a lower viscosity in comparison to linear polymers of the same composition that have the same molecular weight. The acid content of the backbone of the branched polymer can readily be adjusted to maximize dispersion properties of the polymer without increasing molecular weight and not detract from the performance properties of a coating composition into which a pigment dispersion of this polymer has been incorporated. Finishes of aqueous coatings formulated with dispersions containing these branched polymers are hard, water and humidity resistant.

The branched polymer used to formulate the dispersion of this invention is prepared from a macromonomer which forms the side chains of the branched polymer and comprises polymerized alpha-beta ethylenically unsaturated monomers and has one terminal ethylenically unsaturated moiety and has a weight average molecular weight (MW) of 1,000–30,000, preferably 6,000 to 15,000. About 20–80% (by weight), preferably 30–70%, of the macromonomer is copolymerized with 80–20%, preferably 70–30%, of a blend of other alpha, beta-ethylenically unsaturated monomers which form the backbone of the branched polymer. At least 2%, preferably 2–30% by weight, most preferably 3–15%, of the alpha, beta ethylenically unsaturated monomer of the backbone have carboxylic acid functionality and a branched polymer is formed having a MW of 5,000–100,000, preferably 5,000–40,000, which after neutralizing with an amine or other neutralizing agent can be dispersed in water.

All molecular weights referred herein are determined by GPC (gel permeation chromatography) using a polystyrene standard.

It has been found that improved aqueous or waterborne coating compositions are obtained by using these branched polymers as dispersants for pigments. These compositions also contain a film forming binder usually an acrylic polymer and a curing agent. Such compositions have the advantage of providing excellent coating properties desirable for automotive finishes.

The side chains of the branched polymer are hydrophobic relative to the backbone and therefore contain less than 1% by weight, preferably essentially zero percent by weight, based on the weight of the branched polymer, of polymerized ethylenically unsaturated acid-functional monomers which are listed hereinafter. The side chains contain polymerized hydrophobic monomers such as alkyl methacrylates and acrylates, cycloaliphatic methacrylates and acrylates and aryl methacrylates and acrylates and styrene as are listed hereinafter and also may contain up to 30% by weight, based on the weight of the branched polymer, of polymerized ethylenically unsaturated non-hydrophobic monomers which may contain functional groups. Examples of such monomers are hydroxy ethyl acrylate, hydroxy ethyl methacrylate, acrylamide, nitro phenol acrylate, nitro phenol methacrylate, phthalimido methyl acrylate, phthalimido methacrylate, acryloamido propane sulfonic acid, and mixtures thereof.

The acrylic macromonomer may be prepared using a free radical initiator in a solvent with a Co (II) or Co (III) chelate chain transfer agent.

The backbone of the branched polymer contains at least 2 percent by weight of an acid functional (neutralized) monomer as, e.g., acrylic acid, methacrylic acid, maleic acid, itaconic acid and the like. Methacrylic and acrylic acid are preferred. Other acids that can be used are ethylenically unsaturated sulfonic, sulfinic, phosphoric or phosphonic acid and esters thereof, styrene sulfonic acid, acrylamido methyl propane sulfonic acid, vinyl phosphonic or phosphoric acid and its esters and the like also can be used.

The backbone of the branched polymer preferably contains 2–30% by weight methacrylic acid or acrylic acid and preferably, 3 to 15% by weight and has a MW of 1,000–70,000. The acid functional groups on the branched polymer are neutralized with an inorganic base or an amine. The backbone is thus relatively hydrophilic in comparison to the side chains and the branched polymer keeps the pigments well dispersed in the resulting coating composition. Of course, relative hydrophobicity or hydrophilicity could be further adjusted by varying the percent of acid and/or hydroxy functional monomers versus more hydrophobic monomers such as 2-ethyl hexyl methacrylate.

In one preferred embodiments, the branched polymer contains overall (including both backbone and macromonomer arms) about 0 to 40, preferably 5 to 40, and more preferably 10 to 30, percent by weight of hydroxy functional acrylic monomers as, e.g., 2-hydroxyethyl acrylate, 2-hydroxyethyl methacrylate, 2-hydroxypropyl acrylate, 2-hydroxypropyl methacrylate, 2-hydroxybutyl acrylate, 4-hydroxybutyl acrylate and the like. These hydroxy groups can be used for crosslinking in addition to the acid groups. Hydroxy groups are not necessary when acid groups are the only crosslinking functionality on the copolymer. Hydroxy groups are necessary when the cross-linking agent of the coating composition is melamine or blocked organic polyisocyanate.

As indicated earlier, the branched polymer comprises macromonomer side chains attached to a polymeric backbone. Each macromonomer ideally contains a single terminal ethylenically unsaturated group which is polymerized into the backbone of the branched polymer and typically contains polymerized monomers of styrene, esters and/or nitriles and/or amides of methacrylic or acrylic acid or mixtures of these monomers.

Other polymerized ethylenically unsaturated monomers can be present in the macromonomer and backbone, for example (but not limited to), acrylic and methacrylic acid esters of straight-chain or branched monoalcohols of 1 to 20 carbon atoms. Alkyl acrylates and methacrylates having 1–12 carbons in the alkyl group can be used such as methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like can be used. Cycloaliphatic acrylates methacrylates can be used such as trimethylcyclohexyl acrylate, t-butyl cyclohexyl acrylate, cyclohexyl methacrylate, isobornyl methacrylate, 2-ethylhexyl methacrylate, and the like. Aryl acrylates and methacrylates such as benzyl acrylate and benzyl methacrylate also can be used.

Ethylenically unsaturated monomers containing hydroxy functionality include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof.

Suitable other olefinically unsaturated monomers include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and fumaric anhydride and its half and diesters; vinyl aromatics such as styrene alpha methyl styrene and vinyl toluene; and polyethylene glycol monoacrylates and monomethacrylates.

The above monomers also can be used in the backbone of the branched polymer.

The branched polymer may be prepared by polymerizing ethylenically unsaturated monomers in the presence of macromonomers each having a terminal ethylene unsaturation. The resulting branched polymer can be envisioned as being composed of a backbone having a plurality of macromonomer "arms" attached thereto.

In the present composition, both the macromonomer arms and the backbone may have reactive functionality capable of reacting with a crosslinking compound or polymer, although it is optional to have such reactive functionality only or essentially only or substantially only on the backbone.

It is to be understood that the backbone or macromonomers referred to as having functionality may be part of a mixture of macromonomers of which a portion do not have any functionality or variable amounts of functionality. It is also understood that, in preparing any backbone or macromonomers, there is a normal distribution of functionality.

To ensure that the resulting macromonomer only has one terminal ethylenically unsaturated group which will polymerize with the backbone monomers to form the branched polymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethylglyoximato) cobaltate(II) and diaquabis (borondifluorophenylglyoximato) cobaltate (II). Cobalt (III) versions of these catalysts are also preferred. Typically these chain transfer agents are used at concentrations of about 5–1000 ppm based on the monomers used.

The macromonomer is preferably formed in a solvent or solvent blend using a free radical initiator and a Co (II) or (III) chelate chain transfer agent. Examples of solvents are aromatics, aliphatics, ketones, glycol ethers, acetates, alcohols as, e.g., methyl ethyl ketone, isopropyl alcohol, n-butyl glycol ether, n-butyl diethylene glycol ether, propylene glycol methyl ether acetate, propylene glycol methyl ether, and N-butanol.

Peroxy- and azo-initiators (0.5–5% weight on monomer) can be used in the synthesis of the macromonomers in the presence of 2–5,000 ppm (on total monomer) or Co (II)

chelate in the temperature range between 70°–160° C., more preferably azo-type initiators as, e.g., 2,2'-azobis (2,4 dimethylpentane nitrile), 2,2'-azobis (2-methylpropane nitrile), 2,2'-azobis (2-methylbutane nitrile), 1,1'-azo (cyclohexane carbonitrile) and 4,4'-azobis (4-cyanopentanoic) acid.

After the macromonomer is formed as described above, solvent is optionally stripped off and the backbone monomers are added to the macromonomer along with additional solvent and polymerization catalyst. Any of the aforementioned azo-type catalysts can be used as can other suitable catalysts such as peroxides and hydroperoxides. Typical of such catalysts are di-tertiarybutyl peroxide, di-cumyl peroxide, tertiary amyl peroxide, cumene hydroperoxide, di(n-propyl) peroxydicarbonate, peresters such as amyl peroxyacetate and the like. Commercially available peroxy type initiators include, e.g., t-butyl peroxide or Triganox® B from AKZO, t-butyl peracetate or Triganox® FC50 from AKZO, t-butyl perbenzoate or Triganox® C from AKZO, and t-butyl perpivalate or Triganox® 25 C-75 from AKZO.

Polymerization is continued at or below the reflux temperature of the reaction mixture until a branched polymer is formed of the desired molecular weight.

Typical solvents that can be used to form the macromonomer or the branched polymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

In the synthesis of the macromonomer and/or the branched polymer small amounts of difunctional alpha-beta unsaturated compounds can be used as, e.g., ethylene glycol dimethacrylate or hexane diol diacrylate.

After the branched polymer is formed, it is neutralized with an amine or an inorganic base such as ammonium hydroxide or sodium hydroxide and then water is added to form a dispersion. Typical amines that can be used include AMP (2-amino-2-methyl-1-propanol), dimethyl-AMP, amino methyl propanol, amino ethyl propanol, dimethyl ethanol amine, triethylamine and the like. One preferred amine is amino methyl propanol and the preferred inorganic base is ammonium hydroxide.

The conversion into a water dispersion may be accomplished preferably by stripping our 30 to 60% of the solvent followed by admixing with an organic amine or ammonia and diluting with water, or by admixing with a solution of water and amine after the solvent stripping. Alternatively, the branched polymer solution, after stripping, can be stirred slowly into a solution of water and the amine. The degree of neutralization of the dispersion can be from 10 to 150% of the total amount of acid groups, preferably from 40–100%. The final pH of the dispersion can accordingly be about 4–10, preferably 7–9. The solvents can be stripped-off eventually afterwards.

The overall branched polymer water borne dispersion should be characterized by an acid value of from 5 to about 150 (mg KOH/g resin solids), more preferably from 10 to about 70 and still more preferably from 15 to about 35, and an hydroxyl number of about 0 to about 250 (mg KOH/g resin solids), more preferably from 40 to 150.

Particularly useful branched polymers include the following:

a branched polymer having a backbone of polymerized acrylate or methacrylate monomers, styrene monomers, methacrylic or acrylic acid monomers, and hydroxy-functional acrylate or methacrylate monomers, and side chains of a macromonomer having a weight average molecular weight of about 2,000–30,000 and containing about 50% by weight, based on the weight of the backbone, of polymerized alkyl methacrylate or acrylate monomers, hydroxy-functional acrylate or methacrylate monomers and 2–30% by weight, based on the weight of the backbone, of polymerized methacrylic acid or acrylic acid.

a branched polymer having the above backbone of side chains comprising polymerized methyl methacrylate, butyl acrylate, methacrylic acid, styrene, and hydroxyethyl acrylate.

a branched polymer having the above backbone and macromonomers comprising polymerized 2-ethylhexyl acrylate, butyl methacrylate, and hydroxyethyl methacrylate.

a branched polymer having the above backbone and macromonomers of isobutyl methacrylate, 2 ethyl hexyl methacrylate and hydroxy ethyl methacrylate.

The branched polymer is used as a dispersing resin to disperse a wide variety of pigments that are commonly used in waterborne coating compositions. Typical pigments that are used are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones and the like.

To form the water borne pigment dispersion of this invention the branched polymer is neutralized and water is added to form a dispersion with constant mixing and then the dispersion and the pigment to be dispersed is added to a suitable mixing vessel such as an attritor, sand mill, ball mill, two roll mill and the like and then mixed for about 5–150 minutes to form a dispersion having a yield stress of about 0–1,000 Pa (Pascal), a low shear (20 sec-1) viscosity of about 100–10,000 m. Pas (milli Pascal seconds) and a high shear (1,000 sec-1) viscosity of about 10–1,000 m Pas measured on a Rotvfisco viscometer.

An alternative method for forming a pigment dispersion is to add pigment to a solvent solution of the branched polymer before it is neutralized and dispersed in water and forming a dispersion by one of the aforementioned dispersion methods for a pigment dispersion. Then the neutralizing agent of amine or base and water is added with mixing to form an aqueous pigment dispersion.

Waterborne coatings in which the pigment dispersions of the present invention are used contain a binder of an acrylic-based polymer and a crosslinking agent such as a melamine resin or a blocked polyisocyanate in an aqueous carrier. These acrylic polymers form stable solutions or dispersions in water, typically as a dispersed polymer having an average particle size diameter of 10 nm to 1 micron, preferably 20 to 400 nm. These coating compositions contain about 10–70%, more typically 15–50% by weight of binder, and about 30–90%, more typically 50–85% by weight, of an aqueous carrier. The carrier is at least 50% water, preferably 75 to 95% water. Suitable waterborne coatings are prepared by blending other useful components in accordance with normal paint formulation techniques.

To form a composition which will crosslink under elevated baking temperatures of about 60°–180° C. for about 5–60 minutes, about 10 to 40%, preferably 15 to 30% by weight, based on the weight of the binder, of a water-soluble water dispersible alkylated melamine formaldehyde crosslinking agent having 1–4 carbon atoms on the alkylated group is preferred.

These crosslinking agents are generally partially alkylated melamine formaldehyde compounds and may be monomeric or polymeric as described above.

These coating compositions containing a melamine crosslinking agent can contain about 0.1 to 1.0% by weight, based on the weight of a binder, of a strong acid catalyst or a salt thereof to lower curing temperatures and time. Paratoluene sulfonic acid is a preferred catalyst or its ammonium salt. Other catalysts that can be used are dodecyl benzene sulfonic acid, phosphoric acid and amine or ammonium salts of these acids.

Other film forming polymers can also be used in these coating compositions such as acrylourethanes, polyesters and polyester urethanes, polyethers and polyether urethanes that are compatible with the dispersion of the branched polymer.

Although the dispersion of this invention is aqueous, a solvent can be utilized, preferably in minimal amounts, to facilitate formulation and application of the coating compositions formulated with dispersions of the present invention. An organic solvent is utilized which is compatible with the components of the composition.

In addition, coating composition utilizing the dispersion of the present invention may contain a variety of other optional ingredients, including fillers, plasticizers, antioxidants, surfactants and flow control agents.

To improve weatherability of a finish produced of such coating compositions, an ultraviolet light stabilizer or a combination of ultraviolet light stabilizers can be added in the amount of about 0.1–5% by weight, based on the weight of the binder. The stabilizer may be added for example to a dispersion of this invention containing pigments or may be added directly to the coating composition. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica and thickeners such as the Acrylsol® copolymers from Rohm & Haas.

Pigment dispersions of the present invention may be utilized in a pigmented color coat or base coat over which a clear coat is applied to provide a color coat/clearcoat finish. Also, small amounts of pigment dispersion can be added to the clear coat to provide special color or aesthetic effects such as tinting.

Coating compositions formulated with the dispersion of this invention have excellent adhesion to a variety of metallic or non-metallic substrates, such as previously painted substrates, cold rolled steel, phosphatized steel, and steel coated with conventional primers by electrodeposition. These coating composition can be used to coat plastic substrates such as polyester reinforced fiberglass, reaction injection-molded urethanes and partially crystalline polyamides.

Coating compositions formulated with the dispersion of this invention can be applied by conventional techniques such as spraying, electrostatic spraying, dipping, brushing, flowcoating and the like. The preferred techniques are spraying and electrostatic spraying. In OEM applications, the composition is typically baked at 100°–150° C. for about 15–30 minutes to form a coating about 0.1–3.0 mils thick. When the composition is used as a clearcoat, it is applied over the color coat which may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated. All molecular weights disclosed herein are determined by GPC (gel permeation chromatography) using a polystyrene standard.

EXAMPLE 1

A branched polymer was prepared by first preparing a macromonomer and then polymerizing the macromonomer with monomers that form the backbone of the branched polymer. A pigment dispersion was then prepared from the branched polymer.

Preparation of the macromonomer

A macromonomer of 5% IBMA (isobutyl methacrylate), 20% HEMA (hydroxyethyl methacrylate), and 75% 2EHRA (2-ethyl hexyl methacrylate), for use in a preparing a branched polymer was prepared as follows: to a 2-liter flask fitted with an agitator, condenser, heating mantle, nitrogen inlet, thermocouple and an addition port was added 15.25 g of isobutyl methacrylate monomer, 228.94 g of 2-ethyl hexyl methacrylate monomer, 61.07 g of hydroxy ethyl methacrylate monomer and 251.3 g of propylene glycol monomethyl ether. The mixture was agitated and heated to reflux (128°–135° C.) under nitrogen. To this was then added, as a shot, a pre-mix of a solution of 0.5 g of Vazo® 88 initiator [1,1 azobis(cyanocyclohexane)]. 13.8 g of propylene glycol monomethyl ether and 26.1 g of a 0.17% solution of bis(boron difluoro diphenyl glyoximato) cobaltate(II) in ethyl acetate. This was followed by the addition of a pre-mix of a solution of 22.87 g of isobutyl methacrylate monomer, 343.42 g of 2-ethyl hexyl methacrylate monomer, 91.61 g of hydroxy ethyl methacrylate monomer, 2 g of Vazo® 88 initiator, 10.0 g of ethyl acetate, 70.6 g of propylene glycol monomethyl ether over 240 minutes while maintaining a reflux temperature. (116°–122° C.). Following a 30 min. hold period, a pre-mixed solution of 0.4 g of Vazo® 88 initiator, 4.95 g of ethyl acetate and 18 g of propylene glycol monomethyl ether was added over 60 mins. while maintaining reflux. The batch was then held at reflux for an additional 60 mins. at which time a mixture of 0.3 g of t-butyl peroctoate and 33.35 g of ethyl acetate were added as a single add and then the reaction mixture was cooled. The macromonomer thus prepared has a number average molecular weight of 6988 as determined by GPC. Weight solids are 62.3% and Gardner viscosity S. The percent terminal vinyl unsaturation is greater than 95 as determined by thermogravimetric analysis.

Preparation of branched polymer

To a 2-liter flask fitted with an agitator, condenser, heating mantle, nitrogen inlet, thermocouple and an addition part was added 542.7 g of the macromonomer prepared above and 91.7 g of hexanol and the temperature raised to reflux (100° C.) under nitrogen. This was followed by the addition of a premixed solution of 158.4 g of methyl methacrylate monomer (MMA), 73.9 g of styrene monomer (STY), 21.1 g of hydroxy ethyl acrylate monomer (HEA), 118.3 g of butyl acrylate monomer (BA), 50.7 g methacrylic acid monomer (MAA), 4.67 g of Vazo® 88 initiator and 54.9 butyl acetate over 180 minutes holding temperature at 98°–102° C. Following a 60 minute hold period at the same temperature and then the reaction mixture was cooled to 90° C. over a 30 minute period and held at that temperature for 270 minutes and then cooled to room temperature. The branched polymer has a number average molecular weight of 11,960 and a weight average molecular weight of 23,030. Weight solids are 64.4 and Gardner Holdt viscosity is R. The ratio of backbone to macromonomer arms is about 55/45. The composition of the backbone is MMA/STY/BA/HEA/MAA in a weight ratio of 37.5117.5128/5/12.

Preparation of waterborne dispersion of branched polymer

To a 2-liter flask fitted with an agitator, condenser, heating mantle, nitrogen inlet, thermocouple and an addition port was added 500 g of branched polymer prepared above and the temperature raised to distill 97.5 g of solvent. The batch was cooled to less than 80° C. at which time a 23 g of a 95% solution of 2-amino-2-methyl-1-propanol and water were added to neutralize the acid functionality of the branched polymer. The batch was agitated for 10 mins. at which time 853.6 g. deionized water was slowly added over 60 minutes with good agitation and the resulting dispersion was cooled to room temperature. A white, stable dispersion of the branched polymer was obtained having a total weight solids 24.7%, Gardner viscosity A3, pH 8.7 and a particle size of 56 nanometers as determined by quasi electric light scattering.

Preparation of an aqueous white pigment dispersion

A mixture of 97.2 g the branched polymer dispersion prepared above, 62.8 g of deionized water and 240.0 g of Ti Pure R-960 titanium dioxide pigment was ground in an attritor for 2 hours at 500 RPM. The resulting dispersion has a yield stress of 0.49 Pa, a low shear (20 sec-1) viscosity of 74 m. Pas and a high shear (1000 sec-1) viscosity of 40 m. Pas as measured on a Rotvisco viscometer.

As a comparison, a similar dispersion was prepared using a linear polymer having the same monomeric constituents in approximately the same amounts except the methacrylic acid content was 10% and the polymer had a weight average molecular weight of about 10,000. The yield stress of this dispersion was 1.25 Pa, low shear (20 sec-1) viscosity 92 m. Pas and high shear (1000 sec-1) viscosity 38 m. Pas.

A lower molecular weight linear polymer was used for the comparison since this polymer provided an optimum balance of acid content relation to molecular weight. If a linear polymer was used having a weight average molecular weight of 23,000 which is the molecular weight of the branch polymer, the viscosity of the linear polymer would have been too high to form a useful pigment dispersion.

EXAMPLE 2

A white pigment dispersion was prepared as in Example 1 except the following branched polymer was used in place of the branch polymer used in Example 1: the backbone to macromonomer arms ratio was 50/50 and the backbone composition was MMA/STY/BA/HEA/MA in a weight ratio of 45/10/13/20/12 and the weight average molecular weight was 20,500. The resulting dispersion has a yield stress of 0.49 Pa, a low shear (20 sec-1) viscosity of 72 m. Pas and a high shear (1000 sec-1) viscosity of 35 m. Pas.

EXAMPLE 3

A white pigment dispersion was prepared as in Example 1 except the following branched polymer was used in place of the branch polymer used in Example 1: the backbone to macromonomer arms ratio was 60/40 and the backbone composition was MMA/STY/BA/HEA/AA (AA being acrylic acid) in a weight ratio of 23/20/32.6/15/9.4 and the weight average molecular weight was 20,500. The resulting dispersion has a yield stress of 0.16 Pa, a low shear (20 sec-1) viscosity of 58 m. Pas and a high shear (1000 sec-1) viscosity of 38 m. Pas.

EXAMPLE 4

A white pigment dispersion was prepared as in Example 1 except the following branched polymer was used in place of the branch polymer used in Example 1: the backbone to macromonomer arms ratio was 40/60 and the backbone composition was MMA/STY/BA/HEA/AA in a weight ratio of 37/20/8/25/10 and the weight average molecular weight was 24,500. The resulting dispersion has a yield stress of 0.275 Pa, a low shear (20 sec-1) viscosity of 76 m. Pas and a high shear (1000 sec-l) viscosity of 51 m. Pas.

EXAMPLE 5

A red pigment dispersion was prepared by charging the following constituents into a minimill disperser and mixing for 10 minutes: 35 g of Irgazine DPP Red pigment and 28.34 g of the water dispersion of the branched polymer of Example 4 which has been neutralized with 2-amino-2-methyl-1-propanol. The resulting dispersion has a yield stress of 0.09 Pa, a low shear (20 sec-1) viscosity of 18.6 m. Pas and a high shear (1000 sec-1) viscosity of 10.5 m. Pas.

A similar dispersion made as above using a linear polymer having the same constituents except 10% methacrylic acid was used in place of the acrylic acid has a yield stress of 1.04 Pa, a low shear (20 sec-1) viscosity of 66 m. Pas and a high shear (1000 sec-1) viscosity of 22 m. Pas.

EXAMPLE 6

A red pigment dispersion was prepared as in Example 5 except the following branched polymer was used in place of the branch polymer used in Example 5: the backbone to macromonomer arms ratio was 60/40 and the backbone composition was MMA/STY/BA/HEA/AlAA in a weight ratio of 38.6/20/8/25/8.4 and the weight average molecular weight was 27,840. The resulting dispersion has a yield stress of 0.22 Pa, a low shear (20 sec-1) viscosity of 26 m. Pas and a high shear (1000 sec-1) viscosity of 12 m. Pas.

EXAMPLE 7

A red pigment dispersion was prepared by charging the following constituents into a minimill disperser and mixing for 90 minutes: 15 g of Violet NRT-201-D pigment and 12.15 g of the water dispersion of the branched polymer of Example 6 which has been neutralized with 2-amino-2-methyl-1-propanol. The resulting dispersion has a yield stress of 0.0 Pa, a low shear (20 sec-1) viscosity of 3.8 m. Pas and a high shear (1000 sec-1) viscosity of 4.4 m. Pas.

A similar dispersion made as above using a linear polymer having the same constituents except 10% methacrylic acid was used has a yield stress of 0.0 Pa, a low shear (20 sec-1) viscosity of 10.5 m. Pas and a high shear (1000 sec-1) viscosity of 4.5 m. Pas.

EXAMPLE 8

A red pigment dispersion was prepared by charging the following constituents into a minimill disperser and mixing for 90 minutes: 15 g of Violet NRT-201-D pigment and 60.73 g of the water dispersion of a branched polymer of similar to Example 1 except the branch polymer has a backbone to macromonomer arm ratio of 50/50 and the backbone composition is MMA/STY/BA/BEA/AAA in a ratio of 45/10/30/5/10 and a weight average molecular weight of 20,470 and was neutralized with 2-amino-2-methyl-1-propanol. The resulting dispersion has a yield stress of 1.3 Pa, a low shear (20 sec-1) viscosity of 26.8 m. Pas and a high shear (1000 sec-1) viscosity of 17.2 m. Pas.

A similar dispersion made as above using a linear polymer having the same constituents and having a weight average molecular weight of 10,000 has a yield stress of 8.94 Pa, a low shear (20 sec-1) viscosity of 299 m. Pas and a high shear (1000 sec-1) viscosity of 75 m. Pas.

Various modifications, alterations, additions or substitutions of the components of the compositions of this invention will be apparent to those skilled in the art without departing from the scope and spirit of this invention. This invention is not limited to the illustrative embodiments set forth herein, but rather the invention is defined by the following claims.

We claim:

1. A waterbased pigment dispersion useful for forming aqueous coating composition comprising a dispersed pigment, an aqueous carrier and a branched polymer dispersant (binder); wherein the branched polymer has a weight average molecular weight of about 5,000–100,000 and comprises 20–80% by weight of a hydrophilic backbone and correspondingly 80–20% by weight of macromonomer side chains; wherein the backbone consists of polymerized ethylenically unsaturated monomers and 2–30% by weight, based on the weight of the backbone of polymerized ethylenically unsaturated monomers having a carboxylic acid-functional group; and wherein at least 10% of the carboxylic acid-fuinctional groups are neutralized with an amine or an inorganic base and is hydrophilic in comparison to the side chains:

the side chains consist of macromonomers of polymerized ethylenically unsaturated monomers that are polymerized into the backbone via an ethylenically unsaturated group and the macromonomers have a weight average molecular weight of about 1,000–30,000 and wherein said backbone and macromonomers further consist of polymerized ethylenically unsaturated monomers not containing carboxylic functionality, which monomers are selected from the group consisting of alkyl acrylates, alkyl methacrylates, cycloaliphatic acrylates, cycloaliphatic methacrylates, aryl acrylates, aryl methacrylates, styrene, alkyl styrene, acrylonitrile, hydroxy alkyl acrylates, hydroxy alkyl methacrylates and mixtures thereof; and wherein the ethylenically unsaturated monomers containing carboxylic functionality of the backbone are selected from the group consisting of acrylic acid and methacrylic acid, wherein the above mentioned alkyl, cycloaliphatic, and aryl groups each have 1 to 12 carbon atoms and wherein the weight ratio of pigment to binder is about 1/100–200/100.

2. The dispersion of claim 1 wherein the backbone of the branched polymer comprises 3–15% by weight of monomers which have a carboxylic acid functionality or salt thereof.

3. The dispersion of claim 2 wherein the branched polymer comprises 5–40% by weight of polymerized monomers which have a hydroxy functionality.

4. The dispersion of claim 1 in which the backbone of the branched polymer contains 3–15% by weight of a carboxylic acid functional monomer or salt thereof and wherein the polymer has a weight average molecular weight of 5,000 to 40,000, an acid value of 5–150 and a hydroxyl number of 0–250.

5. The dispersion of claim 4 wherein the branched polymer has a hydroxyl number of 40–150, an acid value of 10–70 and a weight average molecular weight of 5,000–40,000.

6. The dispersion of claim 5, wherein said backbone and macromonomers further comprises polymerized ethylenically unsaturated monomers not containing carboxylic functionality, which monomers are selected from the group consisting of alkyl acrylates, alkyl methacrylates, cycloaliphatic acrylates, cycloaliphatic methacrylates, aryl acrylates, aryl methacrylates, styrene, alkyl styrene, acrylonitrile, hydroxy alkyl acrylates, hydroxy alkyl methacrylates and mixtures thereof; and wherein the backbone contains ethylenically unsaturated monomers containing carboxylic functionality selected from the group consisting of acrylic acid and methacrylic acid, wherein the above mentioned alkyl, cycloaliphatic, and aryl groups have 1 to 12 carbon atoms.

7. A coating composition, useful for coating a substrate, which composition comprises an aqueous carrier and a film forming binder and about 1–50% by weight of the pigment dispersion of claim 1.

8. A substrate coated with a dried and cured layer of the composition of claim 7.

9. A process for preparing the dispersion of claim 1 in which the polymer is a branched polymer comprising a polymeric backbone having a plurality of macromonomers polymerized into the backbone having carboxylic functionality, the process comprising (a) preparing macromonomers, in an organic solvent, by polymerizing ethylenically unsaturated monomers using a catalytic chain transfer agent containing cobalt, to form a macromonomer having one terminal ethylenically unsaturated bond;

(b) forming, in an organic solvent, the branched polymer by polymerizing, in the presence of said macromonomers prepared in step (a), ethylenically unsaturated monomers containing 2 to 30% by weight of carboxylic acid groups, whereby said macromonomers are incorporated into said backbone by polymerizing the terminal ethylenically unsaturated bond with the ethylenically unsaturated monomers of the backbone, thereby forming a branched polymer with a molecular weight of 5,000–100,000, which is neutralized with an amine and dispersed in water by inverting the polymer into an aqueous carrier liquid to form a dispersion; and (c) dispersing pigment in the branched polymer dispersion to form a pigment dispersion.

10. A process for preparing the dispersion of claim 1 in which the polymer is a branched polymer comprising a polymeric backbone having a plurality of macromonomers polymerized into the backbone having carboxylic functionality, the process comprising (a) preparing macromonomers, in an organic solvent, by polymerizing ethylenically unsaturated monomers using a catalytic chain transfer agent containing cobalt, to form a macromonomer having one terminal ethylenically unsaturated bond;

(b) forming, in an organic solvent, the branched polymer by polymerizing, in the presence of said macromonomers prepared in step (a), ethylenically unsaturated monomers containing 2 to 30% by weight of carboxylic acid groups, whereby said macromonomers are incorporated into said backbone by polymerizing the terminal ethylenically unsaturated bond with the ethylenically unsaturated monomers of the backbone, thereby forming a branched polymer with a molecular weight of 5,000–100,000, (c) dispersing pigment in the organic solvent branched polymer composition formed in (b) above, (d) adding water and amine to the composition formed in (c) above wherein the polymer is neutralized with an amine and inverted into a water to form a pigment dispersion.

* * * * *